US00RE47365E

(19) United States
(12) Reissued Patent
Patel et al.

(10) Patent Number: US RE47,365 E
(45) Date of Reissued Patent: Apr. 23, 2019

(54) SYSTEMS AND METHODS FOR USING ACTIVE OPTICAL CABLE SEGMENTS

(71) Applicant: CommScope Technologies LLC, Hickory, NC (US)

(72) Inventors: Kamlesh G. Patel, Chanhassen, MN (US); David Stone, Irvine, CA (US); Joseph C. Coffey, Burnsville, MN (US)

(73) Assignee: CommScope Technologies LLC, Hickory, NC (US)

(21) Appl. No.: 15/600,121

(22) Filed: May 19, 2017

Related U.S. Patent Documents

Reissue of:
(64) Patent No.: 9,038,141
Issued: May 19, 2015
Appl. No.: 13/707,908
Filed: Dec. 7, 2012

U.S. Applications:
(60) Provisional application No. 61/567,755, filed on Dec. 7, 2011.

(51) Int. Cl.
*H04L 29/06* (2006.01)
*H04B 10/25* (2013.01)
(Continued)

(52) U.S. Cl.
CPC ..... *H04B 10/25* (2013.01); *G02B 6/36* (2013.01); *H04B 10/40* (2013.01)

(58) Field of Classification Search
CPC .... G02B 6/381; G02B 6/3833; G02B 6/3834; G02B 6/3835; G02B 6/3837;
(Continued)

(56) References Cited

U.S. PATENT DOCUMENTS 5,052,940 A 10/1991 Bengal
5,161,988 A 11/1992 Krupka
(Continued)

FOREIGN PATENT DOCUMENTS

EP 1569494 8/2005
JP 2001297044 10/2001
(Continued)

OTHER PUBLICATIONS

European Patent Office, "Extended European Search Report from EP Application No. 10741842.8 dated Sep. 27, 2012", "from Foreign Counterpart of U.S. Appl. No. 12/705,497", filed Sep. 27, 2012, pp. 1-6, Published in: EP.
(Continued)

*Primary Examiner* — Minh Dieu Nguyen
(74) *Attorney, Agent, or Firm* — Fogg & Powers LLC

(57) ABSTRACT

First and second active optical modules that terminate first and second active optical cable segments, each of which having a respective active end and a respective passive end, can be authenticated by: reading information from active-end storage devices attached to the respective active ends of the first and second active optical modules; providing information read from the active-end storage devices to an aggregation point; reading information from passive-end storage devices attached to the respective passive ends of the first and second active optical cable segments; providing information read from passive-end storage devices to the aggregation point; and authenticating the first and second active optical modules using information provided to the aggregation point.

30 Claims, 4 Drawing Sheets

(51) Int. Cl.
*H04B 10/40* (2013.01)
*G02B 6/36* (2006.01)

(58) Field of Classification Search
CPC .. G02B 6/3843; G02B 6/3847; G02B 6/3851; G02B 6/3854; G02B 6/3855; G02B 6/3859; G02B 6/3865; G02B 6/3869; G02B 6/3871; G02B 6/36; H04B 10/25; H04B 10/40; H04B 10/25759
USPC ..... 713/168; 726/4, 16
See application file for complete search history.

(56) References Cited

U.S. PATENT DOCUMENTS 5,195,902 A 3/1993 Bengal
5,299,944 A 4/1994 Larabell et al.
5,394,503 A 2/1995 Dietz, Jr. et al.
5,418,334 A 5/1995 Williams
5,420,512 A 5/1995 Spillane et al.
5,448,675 A 9/1995 Leone et al.
5,461,693 A 10/1995 Pimpinella
5,463,706 A 10/1995 Dumont et al.
5,473,715 A 12/1995 Schofield et al.
5,483,467 A 1/1996 Krupka
5,487,666 A 1/1996 DiGiovanni
5,541,586 A 7/1996 Wise
5,550,755 A 8/1996 Martin et al.
5,606,664 A 2/1997 Brown et al.
5,649,001 A 7/1997 Thomas et al.
5,764,043 A 6/1998 Czosnowski et al.
5,832,071 A 11/1998 Voelker
5,854,824 A 12/1998 Bengal et al.
5,876,240 A 3/1999 Derstine et al.
5,909,464 A 6/1999 Cohen et al.
5,910,776 A 6/1999 Black
6,002,331 A 12/1999 Laor
6,222,908 B1 4/2001 Bartolutti et al.
6,223,219 B1 4/2001 Uniacke et al.
6,234,830 B1 5/2001 Ensz et al.
6,238,235 B1 5/2001 Shavit et al.
6,240,090 B1 5/2001 Enhager
6,285,293 B1 9/2001 German et al.
6,300,877 B1 10/2001 Schannach et al.
6,307,880 B1 10/2001 Evans et al.
6,330,307 B1 12/2001 Bloch et al.
6,350,148 B1 2/2002 Bartolutti et al.
6,359,859 B1 3/2002 Brolin et al.
6,368,155 B1 4/2002 Bassler et al.
6,424,710 B1 7/2002 Bartolutti et al.
6,442,032 B1 8/2002 Linares et al.
6,499,861 B1 12/2002 German et al.
6,516,345 B1 2/2003 Kracht
6,522,737 B1 2/2003 Bartolutti et al.
6,564,258 B1 5/2003 Uniacke
6,574,221 B1 6/2003 Petersen
6,574,586 B1 6/2003 David et al.
6,577,243 B1 6/2003 Dannenmann et al.
6,636,152 B2 10/2003 Schannach et al.
6,684,179 B1 1/2004 David
6,725,177 B2 4/2004 David et al.
6,778,505 B1 8/2004 Bullman et al.
6,881,096 B2 4/2005 Brown et al.
D510,068 S 9/2005 Haggay et al.
6,961,675 B2 11/2005 David
6,968,994 B1 11/2005 Ashwood Smith
6,976,867 B2 12/2005 Navarro et al.
6,993,417 B2 1/2006 Osann, Jr.
7,038,135 B1 5/2006 Chan et al.
7,039,028 B2 5/2006 Chen et al.
7,042,562 B2 5/2006 Kiani et al.
7,057,105 B2 6/2006 Gottardo et al.
7,075,910 B2 7/2006 Chen et al.
7,077,710 B2 7/2006 Haggay et al.
7,081,808 B2 7/2006 Colombo et al.
7,123,810 B2 10/2006 Parrish
7,126,918 B2 10/2006 Roberts
7,136,936 B2 11/2006 Chan et al.
7,142,536 B1 11/2006 Gossett et al.
7,153,142 B2 12/2006 Shifris et al.
7,159,026 B2 1/2007 Lau et al.
7,160,143 B2 1/2007 David et al.
7,193,422 B2 3/2007 Velleca et al.
7,210,858 B2 5/2007 Sago et al.
7,226,217 B1 6/2007 Benton et al.
7,229,020 B2 6/2007 Goodison et al.
7,234,944 B2 6/2007 Nordin et al.
7,254,652 B2 8/2007 Anderson et al.
7,266,087 B2 9/2007 Wahl
7,289,334 B2 10/2007 Behrens et al.
7,297,018 B2 11/2007 Caveney et al.
7,312,715 B2 12/2007 Shalts et al.
D559,186 S 1/2008 Kelmer
7,315,224 B2 1/2008 Gurovich et al.
7,317,735 B1 1/2008 Ojard
7,328,033 B2 2/2008 Rappaport et al.
7,336,680 B2 * 2/2008 Sorenson ..... H04J 4/00 348/E7.07
D564,966 S 3/2008 Shifris
7,352,289 B1 4/2008 Harris
7,377,819 B1 5/2008 Cooper et al.
7,382,765 B2 6/2008 Kennedy et al.
7,401,985 B2 7/2008 Aronson et al.
D575,743 S 8/2008 Shifris et al.
7,411,405 B2 8/2008 Nordin
7,433,363 B2 10/2008 Rosen et al.
7,440,647 B2 10/2008 Hosking
7,445,389 B2 11/2008 Aronson
7,453,864 B2 11/2008 Kennedy et al.
7,468,669 B1 12/2008 Beck et al.
7,479,032 B2 1/2009 Hoath et al.
7,483,419 B2 1/2009 Bullman et al.
7,499,616 B2 3/2009 Aronson et al.
7,517,243 B2 4/2009 Caveney et al.
7,540,667 B2 6/2009 Murano
7,551,456 B2 6/2009 Behrens et al.
7,564,795 B2 7/2009 Stephenson et al.
7,586,942 B2 9/2009 Golasky et al.
7,616,589 B2 11/2009 Nagata et al.
7,698,156 B2 4/2010 Martucci et al.
7,744,291 B2 6/2010 Dybsetter et al.
7,762,727 B2 7/2010 Aronson
7,765,348 B2 7/2010 Dybsetter
7,778,510 B2 8/2010 Aronson et al.
7,785,930 B2 8/2010 Johnson
7,787,774 B2 8/2010 Nelson
7,808,399 B2 10/2010 McVey
7,809,276 B2 10/2010 Ekkizogloy et al.
7,809,283 B2 10/2010 Hahin et al.
7,819,328 B2 10/2010 Levinson
7,839,266 B2 11/2010 Hoglund et al.
7,841,780 B2 11/2010 Nelson et al.
7,860,399 B2 12/2010 Hsieh
7,870,242 B2 1/2011 Nguyen
7,901,144 B2 3/2011 Deng
7,908,406 B2 3/2011 Dybsetter
7,920,788 B2 4/2011 Nelson et al.
7,933,518 B2 4/2011 Li et al.
7,957,649 B2 6/2011 Dybsetter et al.
7,957,650 B2 6/2011 Pan et al.
7,970,283 B2 6/2011 Giaretta et al.
7,978,800 B2 7/2011 Douma et al.
8,031,992 B2 10/2011 Schrodinger
8,037,173 B2 10/2011 Tuckey et al.
8,068,739 B2 11/2011 Levinson
8,083,417 B2 12/2011 Aronson et al.
8,107,822 B2 1/2012 Noble
8,111,999 B2 2/2012 Ekkizogloy et al.
8,135,282 B2 3/2012 Hosking
8,155,528 B2 4/2012 Nelson
8,165,297 B2 4/2012 Hoffmann
8,200,097 B2 6/2012 Cole
8,225,024 B2 7/2012 Dybsetter
8,229,301 B2 7/2012 Hahin et al.
8,233,793 B2 7/2012 Nelson et al.

(56) References Cited

U.S. PATENT DOCUMENTS

| | | | |
|---|---|---|---|
| 8,250,246 | B2 | 8/2012 | Brockmann et al. |
| 8,267,600 | B2 | 9/2012 | Dybsetter et al. |
| 2001/0001270 | A1 | 5/2001 | Vigliaturo |
| 2002/0138604 | A1 | 9/2002 | Kopelovitz et al. |
| 2003/0046339 | A1 | 3/2003 | Ip |
| 2003/0061393 | A1 | 3/2003 | Steegmans et al. |
| 2003/0194912 | A1 | 10/2003 | Ferentz |
| 2003/0197619 | A1 | 10/2003 | Lawrence et al. |
| 2003/0219033 | A1 | 11/2003 | Silvester |
| 2004/0024717 | A1 | 2/2004 | Sneeringer |
| 2004/0073597 | A1 | 4/2004 | Caveney et al. |
| 2004/0240807 | A1 | 12/2004 | Frohlich et al. |
| 2005/0164548 | A1 | 7/2005 | Spears et al. |
| 2005/0186819 | A1 | 8/2005 | Velleca et al. |
| 2005/0190768 | A1 | 9/2005 | Cutler |
| 2005/0249477 | A1 | 11/2005 | Parrish |
| 2006/0047800 | A1 | 3/2006 | Caveney et al. |
| 2006/0059293 | A1 | 3/2006 | Wurzburg et al. |
| 2006/0147178 | A1 | 7/2006 | Ekkizogloy et al. |
| 2006/0160395 | A1 | 7/2006 | Macauley et al. |
| 2006/0160396 | A1 | 7/2006 | Macauley et al. |
| 2006/0179144 | A1 | 8/2006 | Nagase |
| 2006/0185887 | A1 | 8/2006 | Neujahr |
| 2006/0203715 | A1 | 9/2006 | Hunter et al. |
| 2006/0227759 | A1 | 10/2006 | Bohm et al. |
| 2006/0253561 | A1 | 11/2006 | Holmeide et al. |
| 2006/0268507 | A1 | 11/2006 | Takahashi |
| 2006/0268747 | A1 | 11/2006 | Van Haalen et al. |
| 2006/0282527 | A1 | 12/2006 | Chiou et al. |
| 2007/0025306 | A1 | 2/2007 | Cox et al. |
| 2007/0058338 | A1 | 3/2007 | Lee |
| 2007/0117444 | A1 | 5/2007 | Caveney et al. |
| 2007/0153823 | A1 | 7/2007 | Wojtowicz |
| 2007/0162954 | A1 | 7/2007 | Pela |
| 2007/0230452 | A1 | 10/2007 | Hough et al. |
| 2007/0274234 | A1 | 11/2007 | Kubota |
| 2008/0159738 | A1 | 7/2008 | Lavranchuk |
| 2008/0181136 | A1 | 7/2008 | Watanabe et al. |
| 2008/0181138 | A1 | 7/2008 | Dalberg |
| 2008/0219268 | A1 | 9/2008 | Dennison |
| 2008/0265915 | A1 | 10/2008 | Clark et al. |
| 2009/0074404 | A1 | 3/2009 | Suryaputra et al. |
| 2009/0195349 | A1 | 8/2009 | Frader-Thompson et al. |
| 2010/0020722 | A1 | 1/2010 | Farkas et al. |
| 2010/0040371 | A1 | 2/2010 | Wu et al. |
| 2010/0054157 | A1 | 3/2010 | Farkas et al. |
| 2010/0215049 | A1 | 8/2010 | Raza et al. |
| 2010/0215362 | A1 | 8/2010 | Shimoosako et al. |
| 2010/0238003 | A1 | 9/2010 | Chan et al. |
| 2011/0167269 | A1* | 7/2011 | Baykal et al. ..... 713/169 |
| 2011/0262129 | A1* | 10/2011 | Shaffer et al. ..... 398/5 |
| 2012/0033979 | A1 | 2/2012 | Priyadarshi |
| 2013/0148976 | A1 | 6/2013 | Patel et al. |

FOREIGN PATENT DOCUMENTS

| | | |
|---|---|---|
| KR | 102008017170 | 2/2008 |
| KR | 101020053 | 9/2011 |

OTHER PUBLICATIONS

U.S. Patent and Trademark Office, "Final Office Action", "U.S. Appl. No. 12/705,497", dated Oct. 16, 2012, pp. 1-29.

U.S. Patent and Trademark Office, "Office Action", "U.S. Appl. No. 12/705,497", dated Apr. 17, 2012, pp. 1-31.

Chinese Patent Office, "First Office Action from CN Application No. 201080016490.4 dated Sep. 5, 2012", "from Foreign Counterpart of U.S. Appl. No. 12/705,501", filed Sep. 5, 2012, pp. 1-24, Published in: CN.

European Patent Office, "Extended European Search Report from EP Application No. 10741843.6 dated Sep. 19, 2012", "from Foreign Counterpart of U.S. Appl. No. 12/705,501", filed Sep. 19, 2012, pp. 1-9, Published in: EP.

European Patent Office, "Extended European Search Report from EP Application No. 10741844.4 dated Oct. 11, 2012", "from Foreign Counterpart of U.S. Appl. No. 12/705,506", filed Oct. 11, 2012, pp. 1-9, Published in: EP.

U.S. Patent and Trademark Office, "Office Action", "Application U.S. Appl. No. 12/705,506", dated Jun. 28, 2012, pp. 1-32.

International Searching Authority, "International Search Report from PCT Application No. PCT/US2010/024186 dated Sep. 30, 2010", "from Foreign Counterpart of U.S. Appl. No. 12/705,506", filed Sep. 30, 2010, pp. 1-9, Published in: WO.

Chinese Patent Office, "First Office Action from CN Application No. 201080016472.6 dated Sep. 4, 2012", "from Foreign Counterpart of U.S. Appl. No. 12/705,514", filed Sep. 4, 2012, pp. 1-14, Published in: CN.

European Patent Office, "Extended European Search Report from EP Application No. 10741845.1 dated Oct. 11, 2012", "from Foreign Counterpart of U.S. Appl. No. 12/705,514", filed Oct. 11, 2012, pp. 1-6, Published in: EP.

U.S.Patent and Trademark Office, "Advisory Action", "U.S. Appl. No. 12/705,514", dated Nov. 14, 2012, pp. 1-4, Published in: US.

U.S.Patent and Trademark Office, "Final Office Action", "U.S. Appl. No. 12/705,514", dated Aug. 23, 2012, pp. 1-20, Published in: US.

U.S. Patent and Trademark Office, "Office Action", "U.S. Appl. No. 12/705,514", dated Mar. 15, 2012, pp. 1-25, Published in: US.

United States Patent and Trademark Office, "Notice of Allowance", "From U.S. Appl. No. 13/707,908", dated Jan. 22, 2015, pp. 1-28, Published in: US.

United States Patent and Trademark Office, "Notice of Allowance", "From U.S. Appl. No. 13/707,908", dated Aug. 21, 2014, pp. 1-8, Published in: US.

United States Patent and Trademark Office, "Office Action", "From U.S. Appl. No. 13/707,908", dated Apr. 25, 2014, pp. 1-37, Published in: US.

International Searching Authority, "International Search Report", "from Foreign Counterpart of U.S. Appl. No. 13/707,908", dated Mar. 21, 2013, pp. 1-9, Published in: WO.

Korean Intellectual Property Office, "International Search Report and Written Opinion", "from PCT counterpart of U.S. Appl. No. 13/926,378", dated Sep. 27, 2013, pp. 1-11, Published in: KR.

Figueira et al., "10GE WAN PHY: Physical Medium Attachment (PMA)", "IEEE 802.3 Meeting, Albuquerque", Mar. 2000, pp. 1-42.

"The Ethersmart Wildcard", "http://www.mosaic-industries.com/Products/WildCards/ETHx/", 2008, Publisher: Mosaic Industries, Inc.

European Patent Office, "Extended European Search Report", "from Foreign Counterpart of U.S. Appl. No. 12/705,501", May 22, 2012. pp. 1-7, Published in: EP.

Dimitrov et al., "Embedded Internet Based System", 2008, pp. 103-107.

Farkas et al. , "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.

Feuzeu et al., "A New Scheme for Interconnecting LANS With Label Switching Bridges", "Local Computer Networks, 2005. 30th Anniversary. The IEEE Conference on", Nov. 17, 2005, pp. 303-311. Publisher: IEEE, Published in: Sydney.

Kang et al., "Design and Implementation of Network Management System for Power Line Communication Network", "IEEE International Symposium on Power Line Communications and its Applications (ISPLC 2007)", Mar. 28, 2007, pp. 23-28, Publisher: IEEE.

Milligan, "Intelligent Patching Systems Carving Out a 'Large' Niche", "http://www.cablinginstall.com/index/display/article-display/207641/articles/cabling-installation-maintenance/Volume-12/issue-7/contents/technology/int", Jul. 1, 2004, pp. 1-6, vol. 12, No. 7, Publisher: Cabling Installation & Maintenance.

Mirjalily et al. , "Best Multiple Spanning Tree in Metro Ethernet Networks", "Computer and Electrical Engineering, 2009. ICEE '09. Second International Conference on", Dec. 28-30, 2009, pp. 117-121, vol. 2, Publisher: IEEE, Published in: Dubai.

(56) References Cited

OTHER PUBLICATIONS

International Searching Authority, "International Search Report", "from Foreign Counterpart of U.S. Appl. No. 13/707,908", Mar. 21, 2013, pp. 1-9, Published in: WO.
"Embedded Ethernet System Design Guide", Aug. 2008, Publisher: Silicon Laboratories.
"IntelliMAC", May 2003, pp. 1-6, Publisher: Nordx/CDT.
Meredith, "Managers Missing Point of Intelligent Patching", "http://searchdatacenter.techtarget.com/news/article/0,289142,sid80_gci1099991,00.html", Jun. 21, 2005, pp. 1-2, Publisher: SearchDataCenter.com.
Feltgen, "PCT Patent Application PCT/EP2009/009036: Method and Arrangement for Identifying At Least One Object", Dec. 16, 2009, pp. 1-25, Published in: WO.
"UPnP Device Architecture 1.1", Oct. 15, 2008, pp. 1-272, Publisher: UPnP Forum.

* cited by examiner

SYSTEMS AND METHODS FOR USING ACTIVE OPTICAL CABLE SEGMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED U.S. PATENT DOCUMENTS

This [application] *Reissue Application is a reissue of application Ser. No. 13/707,908, filed Dec. 7, 2012, which issued as U.S. Pat. No. 9,038,141 and which* claims the benefit of U.S. Provisional Patent Application Ser. No. 61/567,755, filed on Dec. 7, 2011, which is hereby incorporated herein by reference.

BACKGROUND

For some high-speed electronic devices (also referred to here as "host devices"), it is desirable to use fiber optic cabling for interconnecting the ports of such devices. Examples of host devices include switches, routers, gateways, access points, server computers, end-user computers, appliance computers (such as network-attached storage (NAS) devices), and nodes of a storage area network (SAN). Typically, using fiber optic cabling with such a host device requires the use of active optical components (for example, to perform electrical-to-optical (E/O) and optical-to-electrical (O/E) conversions necessary for signals to be sent and received by the host device over the passive fiber optic cabling).

However, in some cases, manufacturers of the host devices do not wish to include the active optical components in the host device itself. In these cases, the host devices are designed to be used with active optical cables. An active optical cable includes, in addition to the passive fiber optic cabling, the active optical components that perform the E/O and O/E conversions necessary for signals to be sent and received by the host device over the passive fiber optic cabling. Traditionally, each active optical cable comprises a matched pair of active optical modules that are designed to be used with a single segment of fiber optic cabling (typically a duplex segment comprising two optical fibers). In one type of single-segment active optical cable, each of the matched pair of active optical modules is permanently attached to the single segment of fiber optic cabling. In another type of single segment active optical cable, each of the matched pair of active optical modules includes an appropriate connector or (other mechanism) to removably attach the single segment of fiber optical cabling to the module. With this second type of active optical cable, the fiber optic cabling used in the active optical cable can be changed (for example, to change between single mode fiber and multi-mode fiber or to replace defective cabling). However, with both types of active optical cables, the active optical modules are designed to be used with a single segment of fiber optic cabling, and the modules are designed to be together as a pair.

Each active optical module typically includes an optical transceiver, a controller, a storage device, and an electrical connector. The electrical connector is connected to a port of a host device. Typically, the host device and the active optical module exchange "transmit" and "receive" signals in electrical form (typically, as respective differential signal pairs). The optical transceiver in the active optical module handles the E/O and 0/E conversions necessary for the electrical transmit and receive signals. The interface implemented between the electrical connector and the port of the host device also includes appropriate power and ground lines for providing power and ground to the active components in the active optical module.

Manufacturers of some host devices require that, when an active optical cable is used to connect a port of a first host device to a port of a second host device, the active optical cable must first be authenticated before those ports can be enabled for use with that active optical cable. These ports are also referred to here as "authenticated" ports. This authentication is done, for example, to ensure that only active optical cables manufactured by an authorized manufacturer are used with the host devices.

The interface implemented between the authenticated ports of the host devices and the electrical connectors included in the active optical modules includes one or more signal lines over which data can be exchanged between a given host device and an active optical module that is connected to one of its authenticated ports. These lines are also referred to here as the "control interface." In one example, when an active optical module is connected to an authenticated port of a host device, the host device uses the control interface to write challenge data to the storage device included in the active optical module. The controller in the active optical module then generates an encrypted response by encrypting the challenge data with a private key that is stored in the active optical module. The generated response data is stored in the storage device. The host device then uses the control interface to read the response data from the storage device along with a cable identifier (using the control interface that is provided between the port and the electrical connector). The challenge data, cable identifier, and encrypted response data are provided to an authentication entity (for example, software that is a part of a network management system) for authenticating the active optical module. The authentication entity uses the cable identifier to look up the private key assigned to the active optical module and then decrypts the encrypted response read from the storage device in the active optical module. If the decrypted response matches the challenge data that was encrypted, the associated active optical module is considered to be successfully authenticated.

In some applications, the active optical modules for both ends of the active optical cable must be authenticated before either of the two involved authenticated ports will be enabled for use with that active optical cable. As noted above, the active optical modules used in a single-segment active optical cable traditionally are a "matched pair" in that they are designed to always be used together as a part of the same single-segment active optical cable. For example, both of the active optical modules can be assigned the same cable or module identifier or can be assigned different module identifiers that are associated with one another a priori by the authentication entity. This is the case regardless of whether the single-segment of fiber optic cabling used with such active optical cables is permanently or removably attached to the active optical modules. As a result, it is typically not difficult for the authentication entity to determine which active optical modules are associated with one another for the purposes of authentication. This approach—where both active optical modules that are being authenticated for use with two authenticated ports—would not be suitable, however, where the two active optical modules are not a matched pair that is a part of the same single-element active optical cable.

SUMMARY

One embodiment is directed to a method of authenticating first and second active optical modules that terminate first and second active optical cable segments, each of which having a respective active end and a respective passive end. The method comprises reading information from active-end storage devices attached to the respective active ends of the first and second active optical modules, providing information read from the active-end storage devices to an aggregation point, reading information from passive-end storage devices attached to the respective passive ends of the first and second active optical cable segments, providing information read from passive-end storage devices to the aggregation point, and authenticating the first and second active optical modules using information provided to the aggregation point.

Another embodiment is directed to a system for use with a first and second active optical cable segment, each of the first and second active optical cable segments having a respective active end and a passive end. The system comprises first and second host devices, the first host device having a first authenticated port and the second host device having a second authenticated port. The first authenticated port is configured so that a respective electrical connector terminating the respective active end of the first active optical cable segment can be coupled to the first authenticated port, wherein the first authenticated port is also configured to provide access to a first active-end storage device associated with the active end of the first active optical cable segment when the first active optical cable segment is coupled to the first authenticated port. The second authenticated port is configured so that a respective electrical connector terminating a respective active end of a second active optical cable segment can be coupled to the second authenticated port, wherein the second authenticated port is also configured to provide access to a second active-end storage device associated with the active end of the second active optical cable segment when the second active optical cable segment is coupled to the second authenticated port. The system further comprises first and second passive optical interconnects. The first passive optical interconnect comprises a first port, and the second passive optical interconnect comprises a second port. The first port is configured so that a respective passive optical connector terminating the respective passive end of the first active optical cable segment can be coupled to the first port, wherein the first port is also configured to provide access to a first passive-end storage device associated with the passive end of the first active optical cable segment when the first active optical cable segment is coupled to the first port. The second port is configured so that a respective optical passive connector terminating the respective passive end of the second active optical cable segment can be coupled to the second port, wherein the second port is also configured to provide access to a second passive-end storage device associated with the passive end of the second active optical cable segment when the second active optical cable segment is coupled to the second port. The first and second ports are communicatively coupled to one another via one or more other cable segments. An active optical communication path can be established between the first authenticated port and the second authenticated port using the first active optical cable segment, the second active optical cable segment, and one or more passive cable segments. The system further comprises an aggregation point that is communicatively coupled to the first and second host devices and the first and second passive optical interconnects. The aggregation point is configured to receive: information read from the first and second active-end storage devices attached to the first and second active optical cable segments, respectively; information read from the first and second passive-end storage devices attached to the first and second active optical cable segments, respectively; and information about the one or more other cable segments used to establish the active optical communication path between the first and second authenticated ports. The system further comprises an aggregation point that is communicatively coupled to the aggregation point and the first and second host devices, wherein information indicative of the active optical communication path is communicated from the aggregation point to the authentication entity in connection with authenticating the first and second active optical cable segments for use with the first and second authenticated ports.

Another embodiment is directed to a cable comprising at least a first optical fiber extending from a first end to a second end and an active optical component terminating the first end of the first optical fiber. The active optical component includes an electrical connector configured to receive electrical signals converted from optical signals carried over the first optical fiber. The active optical component includes a first storage device that is electrically connected to the electrical connector. A fiber optic connector terminates the second end of the first optical fiber. The fiber optic connector includes an optical ferrule that is configured to receive optical signals carried over the first optical fiber. The fiber optic connector includes a second storage device and a media reading interface that are isolated from the optical signals carried over the first optical fiber. The second storage device is electrically connected to the media reading interface.

DRAWINGS

DETAILED DESCRIPTION

Figure 1:
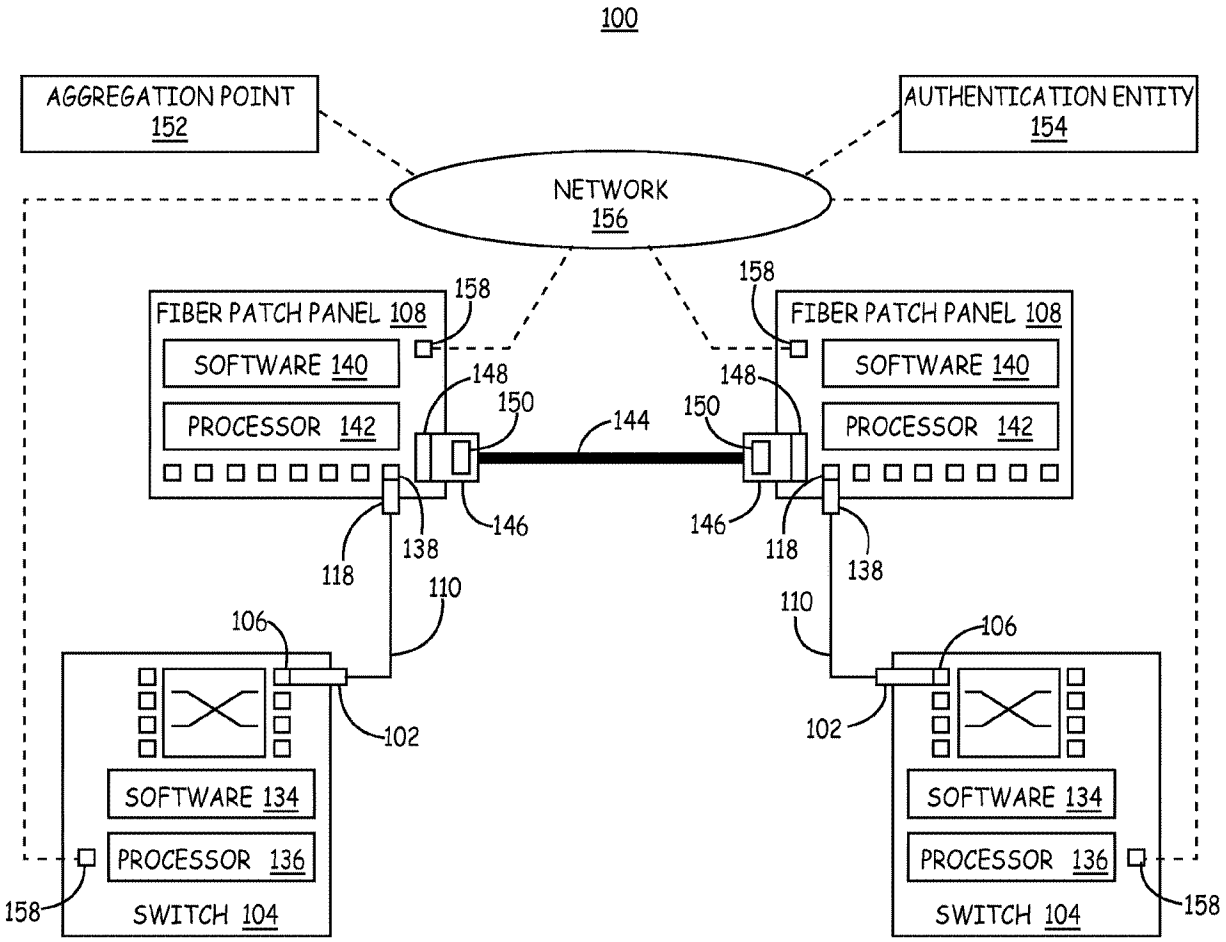
FIG. 1 is a block diagram of one example of a system for authenticating active optical modules.

FIG. 1 is a block diagram of one example of a system 100 for authenticating active optical modules 102.

In this example, the active optical modules 102 that are used to connect two host devices 104 are not part of the same single-segment active optical cable, unlike with the conventional active optical cable products described above. Instead, as described in more detail below, the ports 106 of the host devices 104 are connected to one another using multiple segments of cabling—including both active segments 110 and using one or more fiber patch panels 108 (or other passive optical interconnects). In certain implementations, passive segments 144 also may extend between the patch panels 108 to connect the segments 110. In this way, the benefits of using fiber patch panels 108 (for example, increased or improved flexibility, range, slack and length management, and convenience in making moves, adds, and changes) can be obtained when using active optical modules 102.

However, because the active optical modules 102 that are used to connect two host devices 104 are not part of the same single-segment active optical cable (and are not a matched pair), the active optical modules 102 will not be assigned the same cable or module identifier or otherwise be associated with one another a priori, and the authentication entity 154 that authenticates the active optical modules 102 for use with those host devices 104 will need additional information in order to associate the two active optical modules 102 with one another.

In this example, the cable segments that are directly connected to the ports 106 of the host devices 104 are referred to here as the "active optical cable segments" 110.

Figure 2:
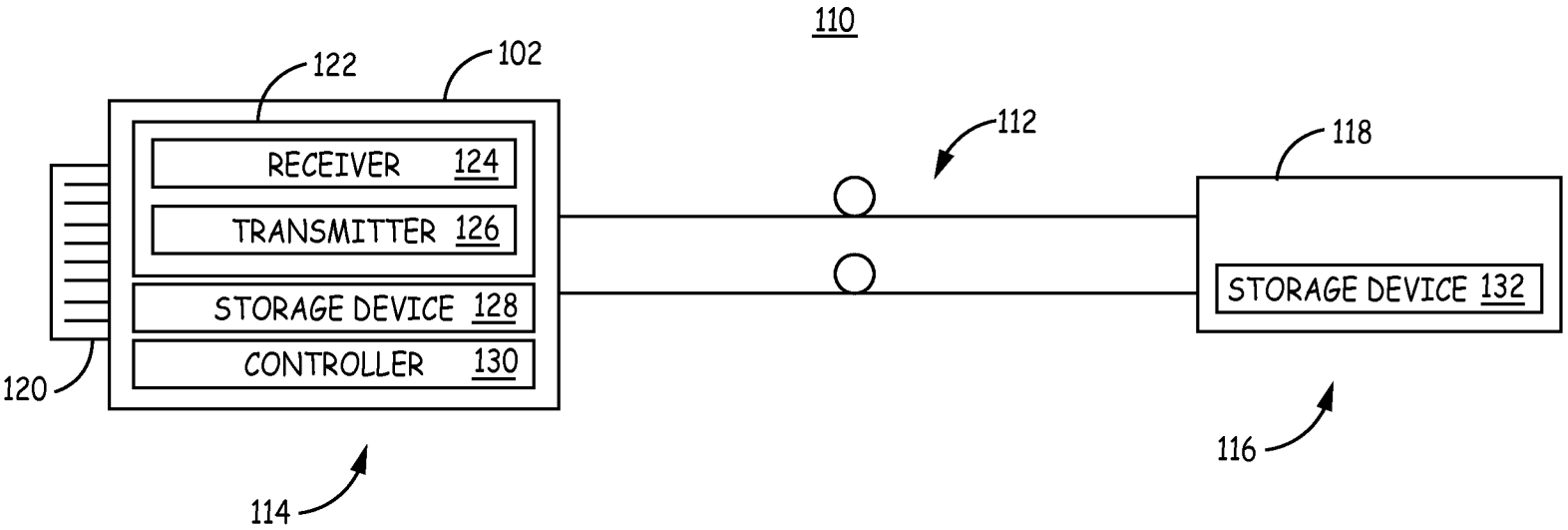
FIG. 2 is a block diagram of one example of an active optical cable segment suitable for use in the example shown in FIG. 1.

One example of an active optical cable segment 110 suitable for use in the example shown in FIG. 1 is shown in more detail in FIG. 2. The active optical cable segment 110 shown in FIG. 2 is a full-duplex cable having a pair of fibers 112 (though it is to be understood that the techniques described here can be used with other types of active optical cables segments, such as half-duplex cable segments and/or half-duplex cable segments and/or full-duplex cable segments that implement more than one half-duplex or full-duplex optical channel).

Each active optical cable segment 110 has an active end 114 and a passive end 116. Each active optical cable segment 110 includes an active optical module 102 that is attached to the active end 114 of that active optical cable segment 110 (more specifically, to the active end 114 of the fiber pair 112 used in the active optical cable segment 110). Each active optical module 102 also includes a passive optical connector 118 that is attached to the passive end 116 of the active optical cable segment 110 (more specifically, to the passive end 116 of the fiber pair 112 used in the active optical cable segment 110).

Each active optical module 102 includes an electrical connector 120 by which transmit and receive signals are input and output in electrical form (typically, as respective differential signal pairs) to and from the active optical module 102. The electrical connector 120 also includes appropriate power and ground lines for providing power and ground to the active components in the active optical module 102. In the example shown in FIG. 2, the active optical module 102 is a Gigabit ETHERNET active optical module that implements one or more of the Institute of Electrical and Electronics Engineers (IEEE) 802.3 family of standards relating to 10 or 40 Gigabit ETHERNET. In this example, the electrical connector 120 is implemented as an edge-type connector having contact traces for each of the lines required by the Gigabit ETHERNET standards relating to electrical Gigabit ETHERNET connectors (that is, TX− and TX+ contact traces for the "transmit" differential signal pair and RX− and RX+ contact traces for the "receive" differential signal pair). The electrical connector 118 also includes contact traces for power (PWR) and (GND) lines for providing power and ground to the components of the active optical module 102.

Each active optical module 102 includes the active optical components that perform the electrical-to-optical (E/O) and optical-to-electrical (O/E) conversions necessary for signals to be sent and received over the fiber pair 112. In the example shown in FIG. 2, the active optical module 102 includes an optical transceiver 122. The optical transceiver 122 comprises a receiver circuit 124 that receives a first optical signal from a first one of the optical fibers 112 and produces a first (received) electrical signal from the first optical signal suitable for outputting from the electrical connector 120. The optical transceiver 122 further comprises a transmitter circuit 126 that receives the electrical transmit signal from the electrical connector 120 and outputs a second (transmit) optical signal for communicating over the second one of the optical fibers 112. As noted above, in this example, the received electrical signal is output on the electrical connector 120 as a differential pair of electrical signals (RX+ and RX−) that complies with one or more of the IEEE 802.3 family of standards relating to 10 or 40 Gigabit ETHERNET. Likewise, the transmit electrical signal to be transmitted on the active optical cable segment 110 is supplied on the electrical connector 120 as a differential pair of electrical signals (TX+ and TX−) that complies with one or more of the IEEE 802.3 family of standards relating to 10 or 40 Gigabit ETHERNET.

Although the example shown in FIG. 2 is described here as being implemented using Gigabit ETHERNET technology, the techniques described here can be used with other communication technology. For example, and without limitation, the techniques described here can be used to implement active optical modules and active optical cable segments that use one or more of FIBRE CHANNEL, INFINIBAND, Serial Attached SCSI (SAS), and SONET/SDH technology.

In this example, each active optical module 102 also includes a storage device 128 (also referred to here as an "active-end" storage device 128) and a controller 130. The electrical connector 120 in each active optical module 102 is configured to include a control interface via which the controller 130 and the active-end storage device 128 can be accessed. In the particular example shown in FIG. 2, the control interface implemented by the electrical connector 120 includes one "data" contact trace (DATA) and one "clock" contact trace (CLK) over which data and clock signals are exchanged between the host device 104 and the controller 130 and the active-end storage device 128 in the active optical module 102. However, it is to be understood that the control interface implemented by the electrical connector 120 can be implemented in other ways.

As shown in FIG. 2, each active optical cable segment 110 also includes a passive optical connector 118 at the passive end 116 of the active optical cable segment 110. One example of a passive optical connector 118 is a duplex LC or SC fiber connector. In this example, each passive optical connector 118 includes (or is otherwise associated with) a storage device 132 (which is also referred to here as the "passive-end" storage device 132). The passive optical connector 118 is configured to include a storage-device interface via which the passive-end storage device 132 can be accessed. This storage-device interface is also referred to here as the "passive-end" storage-device interface, which can also be implemented by incorporating appropriate electrical contacts in the passive optical connector 118.

Various examples of passive-end storage device interfaces are described in United States Patent Publication No. US 2011-0116748, filed Oct. 15, 2010, and titled "MANAGED CONNECTIVITY IN FIBER OPTIC SYSTEMS AND METHODS THEREOF," U.S. patent application Ser. No. 13/025,841, filed on Feb. 11, 2011, titled "MANAGED FIBER CONNECTIVITY SYSTEMS," and U.S. patent application Ser. No. 13/025,750, filed on Feb. 11, 2011, titled "COMMUNICATIONS BLADED PANEL SYSTEMS," U.S. Provisional Patent Application Ser. No. 61/152,624, filed on Feb. 13, 2009, titled "MANAGED CONNECTIVITY SYSTEMS AND METHODS," and U.S.

patent application Ser. No. 12/705,497, filed on Feb. 12, 2010, titled "AGGREGATION OF PHYSICAL LAYER INFORMATION RELATED TO A NETWORK," all of which are hereby incorporated herein by reference. In some of these examples, a four-line storage-device interface is used, where the interface includes a single data line for reading and writing data, a power line for providing power to the storage device, a ground line for providing a ground level, and an extra line reserved for future use. Also, in these examples, a storage device that supports the UNI/O bus protocol is used, where the UNI/O bus protocol is used for communicating over the single data lead.

In the example shown in FIG. 1, the system 100 is described here as including two host devices 104 that are implemented as Gigabit ETHERNET switches 104 (though the system 100 can include more than two switches 104 and/or different types of host devices 104). Consequently, the two host devices 104 shown in FIG. 1. are also referred to here as "switches" 104. Examples of other types of host devices 104 that can be used include, without limitation, routers, gateways, access points), server computers, end-user computers, appliance computers (such as network-attached storage (NAS) devices), and nodes of a storage area network (SAN). Also, in the example shown in FIG. 1, the system 100 includes two passive optical interconnects 108 that are implemented as two fiber patch panels 108 (though the system 100 can include a different number of fiber patch panels 108 and/or different types of passive optical interconnects 108). Consequently, the two passive optical interconnects 108 shown in FIG. 1. are also referred to here as "fiber patch panels" 108. Examples of other types of passive optical interconnects 108 that can be used include, without limitation, other types of optical patch panels, fiber distribution hubs (FDH), fiber splice panels, fiber trays, and fiber termination points. Examples of active optical modules 102 and active optical cable segments 110 include, without limitation, GIGABIT ETHERNET, FIBRE CHANNEL, INFINIBAND, Serial Attached SCSI (SAS), and SONET/SDH active optical modules or active optical cable segments.

Many types of host devices 104 and passive optical interconnects 108 include multiple ports, though the techniques described here are not limited to host devices 104 or passive optical interconnects 108 that include multiple ports.

In this example, any active optical modules 102 (which are attached to the active optical cable segments 110) must be authenticated before the ports 106 can be enabled for use with those active optical modules 102. Consequently, the ports 106 of the switches 104 are also referred to here as "authenticated" ports 106.

In the example shown in FIG. 1, an authenticated port 106 of a first one of the two switches 104 is connected to an authenticated port 106 of a second one of the two switches 104 using two active optical cable segments 110. For ease of explanation, the first one of the two switches 104 is also referred to here as the "first" switch 104, the corresponding authenticated port 106 is also referred to here as the "first" authenticated port 106. The active optical module 102 and active optical cable segment 110 attached to the first authenticated port 106 are also referred to here as the "first" active optical module 102 and the "first" active optical cable segment 110, respectively. Similarly, the second one of the two switches 104 is also referred to here as the "second" switch 104, the corresponding authenticated port 106 is also referred to here as the "second" authenticated port 106. The active optical module 102 and active optical cable segment 110 attached to the second authenticated port 106 are also referred to here as the "second" active optical module 102 and the "second" active optical cable segment 110, respectively.

In the example shown in FIG. 1, each of the ports 106 of the switches 104 are configured to include a control interface (not separately shown). The control interface in the ports 106 is configured to mate with and inter-operate with the control interface used in the electrical connectors 120 attached to each of the active optical modules 102. Software 134 executing on a programmable processor (such as a controller) 136 associated with each switch 104 is able to read and write data to the active-end storage device 128 included in each active optical module 102 that is attached to a given port 106 using that port's control interface. The software 134 and programmable processor 136 are implemented in a conventional manner except as described here.

In the example shown in FIG. 1, the passive optical connector 118 at the passive end 116 of the first active optical cable segment 110 is connected to a full-duplex port 138 of one of the two fiber patch panels 108. This fiber patch panel 108 is also referred to here as the "first" patch panel 108, and the port 138 to which the first active optical cable segment 110 is connected is also referred to here as the "first patch-panel port" 138. The passive optical connector 118 at the passive end 116 of the second active optical cable segment 110 is connected to a full-duplex port 138 of the second of the two fiber patch panels 108. This fiber patch panel 108 is also referred to here as the "second" patch panel 108, and the port 138 to which the second active optical cable segment 110 is connected is also referred to here as the "second patch-panel port" 138.

In the example shown in FIG. 1, each of the patch-panel ports 138 of the fiber patch panels 108 are configured to include a storage-device interface (not separately shown). The storage-device interface in each port 138 is configured to mate, and inter-operate, with the storage-device interface used in the passive optical connector 118 attached to the passive end 116 of a given active optical cable segment 110. Software 140 executing on a programmable processor (such as a controller) 142 associated with the fiber patch panel 108 is able to read and write data from and to the passive-end storage device 132 associated with any passive optical connector 118 that is connected to a given port 138 using that port's storage-device interface. The software 140 and programmable processor 142 can be implemented in the manner described in the aforementioned US provisional patent applications and US non-provisional patent applications.

In this example, each patch panel port 138 in the first fiber patch panel 108 is communicatively coupled to a respective patch-panel port 138 in the second fiber patch panel 108 via an optical trunk cable 144. The optical trunk cable 144 is a multiple-fiber cable, where each duplex port 138 of each of the fiber patch panels 108 is connected to a respective pair of fibers in the trunk cable 144. The trunk cable 144 includes a multi-fiber connector 146 (for example, a suitable MPO or MTP connector) at each end of the cable 144. Each fiber patch panel 108 includes a trunk connector 148 (for example, a suitable MPO or MTP connector) designed to be connected to the multi-fiber connector 146 attached to the trunk cable 144. However, it is to be understood that patch panel ports 138 in the first fiber patch panel 108 can be communicatively coupled to respective patch-panel ports 138 in the second fiber patch panel 108 in other ways. For example, an optical patch cable comprising a pair of optical fibers terminated with a pair of connectors (such as LC or SC connectors) can be used to communicatively couple pairs of duplex ports 138 of the patch panels 108 to one another.

In this example, each multi-fiber connector 146 attached to the optical trunk cable 144 also includes or is otherwise associated with a respective storage device 150, and the connectors 146 and 148 include or are otherwise associated with a respective storage-device interface (not shown) by which the software 140 running on each fiber patch panel 108 can read and write data to the storage device 150. The storage devices 150 that are included in or otherwise associated with the multi-fiber connectors 146 attached to the trunk cable 144 are also referred to here as the "trunk-cable" storage devices 150. The storage-device interface can implemented as described in the manner described in the aforementioned US provisional patent applications and US non-provisional patent applications.

In other implementations, the trunk cable 144 plugged into the first patch panel 108 is different from the trunk cable 144 plugged into the second patch panel 108. In some implementations, the two trunk cables 144 may be connected at a third patch panel. In other implementations, the two trunk cables 144 may be connected using a panel network of multiple patch panels and trunk cables. In still other implementations, multiple trunk cables may extend between the first and second patch panels 108. For example, in some implementations, multiple single optical fiber cables may extend between the patch panels 108 or panel network. In other implementations, multiple multi-fiber cables may extend between the patch panels 108 or panel network.

Non-limiting examples of patch panels suitable for use as panels 108 are shown and disclosed in U.S. patent application Ser. No. 13/025,750 and United States Publication No. US 2011-0116748, which were incorporated by reference above. Other non-limiting examples of patch panels suitable for use as panels 108 are shown and disclosed in United States Publication No. US 2011-0115494 A1, filed Oct. 19, 2010, and titled "MANAGED ELECTRICAL CONNECTIVITY SYSTEMS," U.S. application Ser. No. 12/905,689, filed Oct. 15, 2010, and titled "MANAGED CONNECTIVITY IN ELECTRICAL SYSTEMS AND METHODS THEREOF," U.S. patent application Ser. No. 13/295,742, filed on Nov. 14, 2011, and titled "CABLE MANAGEMENT IN RACK SYSTEMS," U.S. Provisional Patent Application Ser. No. 61/466,696, filed Mar. 23, 2011, and titled "CABLE MANAGEMENT IN RACK SYSTEMS," U.S. Provisional Patent Application Ser. No. 61/476,041, filed Apr. 15, 2011, and titled "MANAGED ELECTRICAL CONNECTIVITY SYSTEMS," and U.S. patent application Ser. No. 13/446,574, filed Apr. 13, 2012, and titled "MANAGED ELECTRICAL CONNECTIVITY SYSTEMS," the disclosures of which are hereby incorporated by reference herein in their entirety.

In the example shown in FIG. 1, the first and second authenticated ports 106 of the first and second switches 104 are communicatively coupled to one another by connecting the electrical connector 120 attached to the active end 114 of the first active optical cable segment 110 to the first authenticated port 106, connecting the passive optical connector 118 attached to the passive end 116 of the first active optical cable segment 110 to the first patch-panel port 138, connecting the passive optical connector 118 attached to the passive end 116 of the second active optical cable segment 110 to the second patch-panel port 138, and connecting the electrical connector 120 attached to the active end 114 of the second active optical cable segment 110 to the second authenticated port 106. In this example, the trunk cable 144 attached to the trunk connectors 148 of the first and second fiber patch panels 108 communicatively couples the first patch panel port 138 and the second patch panel port 138 to one another. In this way, the first and second authenticated ports 106 of the first and second switches 104 are communicatively coupled to another.

In the example shown in FIG. 1, the system 100 further comprises an aggregation point 152 and an authentication entity 154. The aggregation point 152, authentication entity 154, switches 104, and fiber patch panels 108 communicate with one another over a network 156. The computers on which the aggregation point 152 and authentication entity 154 are implemented include an appropriate network interface to communicatively couple those computers to the network 156. In the example shown in FIG. 1, the programmable processors 136 and 142 in the switches 104 and fiber patch panels 108, respectively, are communicatively coupled to the network 156 by including a respective "management" or "non-service" port 158 that is separate from the "service" ports 106 and 138. However, one or more of the programmable processors 136 and 142 in the switches 104 and fiber patch panels 108, respectively, can be communicatively coupled to the network 156 using one or more of the "service" ports 106 and 138.

In one embodiment, the network 156 comprises an INTERNET PROTOCOL network. The network 156 can be implemented using one or more of a local area network (LAN), a wide area network (WAN), the INTERNET, a virtual local area network (VLAN), and a virtual private network (VPN), an enterprise network, and a telecommunication service provider network. Moreover, the switches 104 and fiber patch panels 108 can be a part of the equipment used to implement the network 156.

The authentication entity 154 is typically implemented in software that runs on a computer that is coupled to the network 156. In one embodiment, the authentication entity 154 is implemented as software that runs on a server maintained by the manufacture of the switches 104 or the active optical cable segments 110. In another embodiment, the authentication entity 154 is implemented as software that runs on a computer that is local with respect to the switches 104 (for example, on a computer that is also running a network management system for the network that the switches 104 are a part of). In another embodiment, the authentication entity 154 is implemented as software that runs on the switches 104 themselves.

In this example, the switches 104 communicate with the authentication entity 154 using a suitable communication protocol (such as the Simple Network Management Protocol (SNMP). For example, when the first active optical module 102 is connected to the first authenticated port 106 of the first switch 104, the software 134 executing on the first switch 104 sends a message informing the authentication entity 154 of that fact and including information that the authentication entity 154 uses in authenticating the first active optical module 102 as described in more detail below. Examples of such information include a segment or module identifier, challenge data, and encrypted response data. Then, after performing the authentication processing described below is completed, the authentication entity 154 can send a response to the first switch 104 either enabling or disabling the first authenticated port 106 depending on whether both the first and second active optical modules 102 were successfully authenticated.

The aggregation point 152 is typically implemented as software that runs on a computer that is coupled to the network 156.

The aggregation point 152 is configured to receive physical layer information pertaining to various devices and media used to implement the physical layer in the network 156 (not just the active optical cable segments 110). The physical layer information (PLI) includes information about various devices in the network 156 (for example, information about the switches 104 and fiber patch panels 108) (also referred to here as "device information") as well as information about any segments of physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various segments of physical communication media (for example, from storage devices that are attached to the active optical cable segments 110 and the optical trunk cables 144).

Examples of media information that can be stored in such storage devices include, without limitation, an identifier that uniquely identifies that particular segment of physical communication media (similar to an ETHERNET Media Access Control (MAC) address but associated with the physical communication media and/or connector attached to the physical communication media), a part number, a plug or other connector type, a cable or fiber type and length, a serial number, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices. For example, testing, media quality, or performance information can be stored in such storage devices. The testing, media quality, or performance information, for example, can be the results of testing that is performed when a particular segment of media is manufactured or installed.

The media information can also include information about physical communication media that does not have any storage devices attached to it. This latter type of media information can be manually supplied to the aggregation point 152.

The aggregation point 152 includes a database or other data store (not shown) for storing the physical layer information provided to it. The aggregation point 152 also includes functionality that provides an interface for external devices or entities to access the physical layer information maintained by the aggregation point 152. This access can include retrieving information from the aggregation point 152 as well as supplying information to the aggregation point 152. In this example, the aggregation point 152 is implemented as "middleware" that is able to provide such external devices and entities with transparent and convenient access to the PLI maintained by the aggregation point 152. Because the aggregation point 152 aggregates PLI from the relevant devices in the network 156 and provides external devices and entities with access to such PLI, the external devices and entities do not need to individually interact with all of the devices in the network 156 that provide PLI, nor do such devices need to have the capacity to respond to requests from such external devices and entities.

The aggregation point 152, in this example, implements an application programming interface (API) by which application-layer functionality can gain access to the physical layer information maintained by the aggregation point 152 using a software development kit (SDK) that describes and documents the API.

More information about physical layer information and the aggregation point 152 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

Figure 3A:
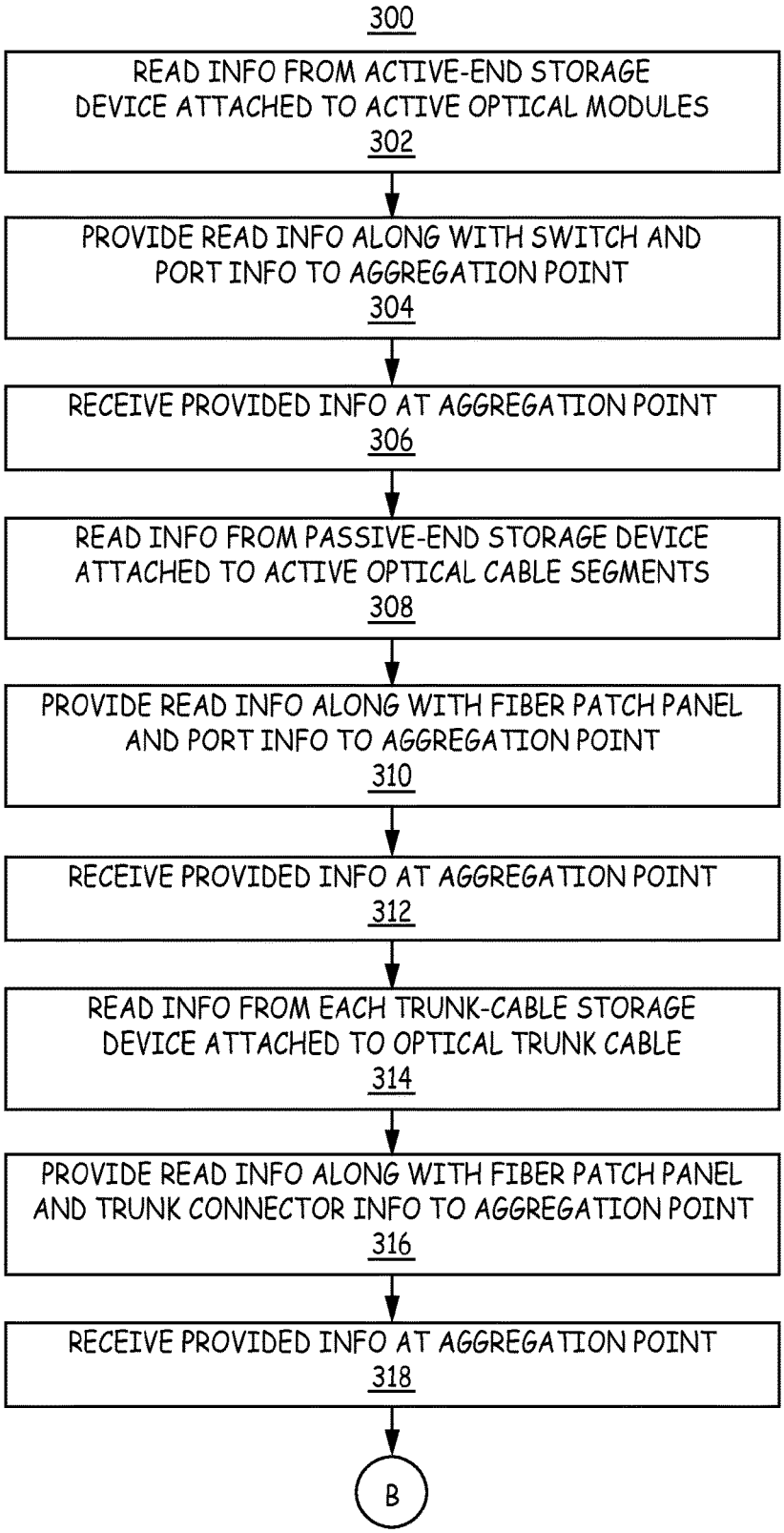
FIGS. 3A-3B are flow diagrams of one example of a method of authenticating one or more active optical modules.
Figure 3B:
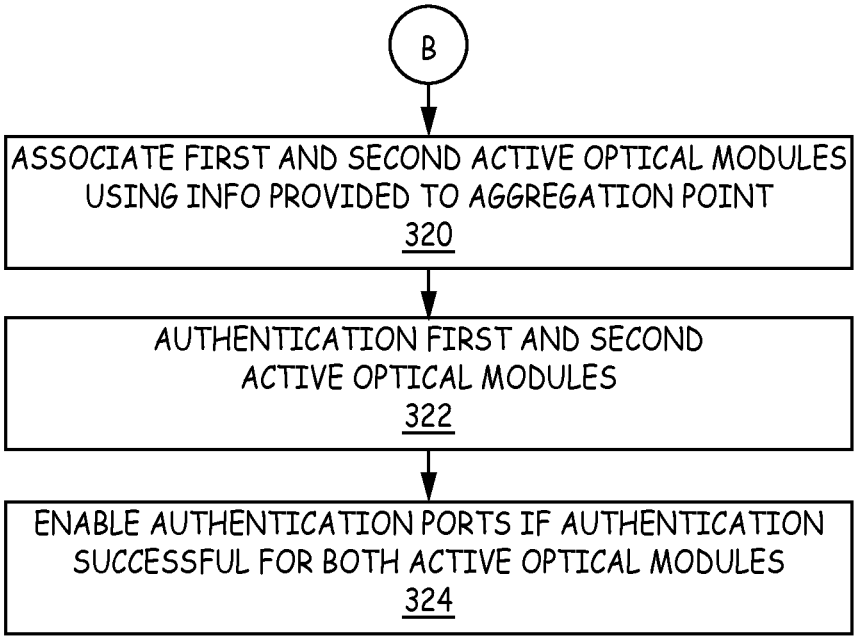

One example of a method 300 of authenticating one or more active optical modules 102 is shown in FIGS. 3A-3B. The example shown in FIGS. 3A-3B is described here as being implemented in the example system 100 shown in FIG. 1, though it is to be understood that method 300 can be implemented and used in other ways.

Method 300 comprises reading information from the active-end storage device 128 attached to each of the first and second active optical modules 102 (block 302 shown in FIG. 3A) and providing at least some of the read information, along with information about the switch 104 and the authenticated ports 106, to the aggregation point 152 (block 304). Method 300 further comprises receiving this information at the aggregation point 152 and adding it to the database maintained by the aggregation point 152 (block 306). In this example, when the electrical connector 120 attached to each of the first and second active optical modules 102 is attached to the first and second authenticated ports 106, respectively, the software 134 associated with the respective switch 104 first writes challenge data to the associated active-end storage device 128 using the control interface implemented between that electrical connector 120 and that authenticated port 106. Then, the controller 130 in that active optical module 102 encrypts the challenge data in order to produce an encrypted response, which the controller 130 then writes to the active-end storage device 128. The software 134 associated with the switch 104 then uses the control interface implemented between the electrical connector 120 and the authenticated port 106 to read the encrypted response from the active-end storage device 128 along with one or more identifiers (for example, a module or segment identifier) that identify the active optical module 102 and/or the active optical cable segment 110. The software 134 executing on that switch 104 sends a message to the authentication entity 154 that informs the authentication entity 154 that the active optical module 102 has been attached to that authenticated port 106 and that includes information identifying the active optical module 102 (and/or active optical cable segment 110 of which it is a part), the switch 104, and the authenticated port 106 (for example, by providing a module or segment identifier, switch identifier, and a port identifier) along with the challenge data and encrypted response data.

Also, the software 134 executing on that switch 104 provides information identifying the active optical module 102 (and/or active optical cable segment 110 of which it is a part), the switch 104, and the authenticated port 106 (for example, by providing a module or segment identifier, switch identifier, and a port identifier) to the aggregation point 152. As is noted below, the information that is provided to the aggregation point 152 to identify the active optical module 102 (and/or the active optical cable segment 110 of which it is a part), the switch 104, and/or the authenticated port 106 may not be the same as the identifier information provided to, and used by, the authentication entity 154 to identify those things (for example, because the manufacture of the switch 104 or the active optical module 102 wishes for such information to remain confidential).

The processing associated with blocks 302-306 is performed for each of the first and second authenticated ports 106.

Method 300 further comprises reading information from the passive-end storage device 132 attached to the passive end 116 of each of the first and second active optical cable segments 110 (block 308) and providing the read information, along with information about the associated fiber patch panel 108 and patch-panel port 138, to the aggregation point 152 (block 310). Method 300 further comprises receiving this information at the aggregation point 152 and adding it to the database maintained by the aggregation point 152 (block 312). In this example, when the passive optical connector 118 attached to the passive end 116 of each of the first and second active optical cable segments 110 is attached to each of the first and second patch-panel ports 138, respectively, the software 140 associated with the respective fiber patch panel 108 reads information from the associated passive-end storage device 132 using the storage-device interface implemented between that passive optical connector 118 and that patch-panel port 138 and communicates the read information to the aggregation point 152. In association with the information read from the passive-end storage device 132, the software 140 communicates information about the fiber patch panel 108 and the patch panel port 138 to the aggregation point 152. The aggregation point 152 receives this information and adds it to the database it maintains.

The information read from the passive-end storage device 132 can include, for example, an identifier for the active optical cable segment 110 and/or an identifier that identifies the active optical module 102 that is attached to the active-end 114 of that active optical cable segment 110. Also, the information read from the passive-end storage device 132 can include other information about the active optical cable segment 110, the associated active optical module 102, or passive optical connector 118. Other examples of media information that can be read from the storage device 132 are described above. The information read from the passive-end storage device 132 is provided to the aggregation point 152 along with information that identifies the fiber patch panel 108 and the patch-panel port 138 (for example, by including a patch panel identifier and a port identifier). The information about the fiber patch panel 108 that is provided to the aggregation point 152 includes, in this example, a port map that associates each patch-panel port 138 with one of the fiber pairs in the optical trunk cable 144.

The processing associated with blocks 308-312 is performed for each of the first and second patch-panel ports 138.

Method 300 further comprises reading information from each trunk-cable storage device 150 attached to the optical trunk cable 144 (block 314) and providing to the aggregation point 152 the read information along with information about the associated fiber patch panel 108 and associated trunk connector 148 (block 316). Method 300 further comprises receiving this information at the aggregation point 152 and adding it to the database maintained by the aggregation point 152 (block 318).

In this example, when the multi-fiber connector 146 attached to each end of the trunk cable 144 is connected to the trunk connector 148 of each of the first and second fiber patch panels 108, the software 140 associated with that respective fiber patch panel 108 reads information from the associated trunk-cable storage device 150 using the storage-device interface implemented between the connectors 146 and 148 and communicates the read information to the aggregation point 152. In association with the information read from trunk-cable storage device 150, the software 140 communicates to the aggregation point 152 information that associates that optical trunk cable 144 (and the associated multi-fiber connector 146) with the trunk connector 148 it is inserted into and the associated fiber patch panel 108. The aggregation point 152 receives this information and adds it to the database it maintains.

The information read from the trunk-cable storage device 150 can include, for example, an identifier for the trunk cable 144. Also, the information read from the trunk-cable storage device 150 can include other information about the trunk cable 144 or the associated multi-fiber connector 146. Other examples of media information that can be read from the trunk-cable storage device 150 are described above. The information read from the trunk-cable storage device 150 is provided to the aggregation point 152 along with information that identifies the fiber patch panel 108 and the trunk connector 148 (for example, by including a patch panel identifier and a trunk connector identifier).

The processing associated with blocks 314-318 is performed for each of the trunk connectors 148.

Although blocks 302-306, blocks 308-312, and 314-318 are arranged sequentially in FIG. 3, it is to be understood that the processing associated with those blocks can occur in any order depending on when the respective connectors are inserted. For example, where the fiber patch panels 108 are first installed and coupled to one another using the optical trunk cable 144, followed by the electrical connectors 120 attached to the first and second active optical modules 102 being attached to the first and second authenticated ports 106, respectively, and followed by the passive optical connectors 118 attached to the passive ends 116 of each of the first and second active optical cable segments 110 being attached to each of the first and second patch-panel ports 138, respectively, the processing associated with blocks 314-318 will be performed first, followed by the processing associated with blocks 302-306, and then followed by the processing associated with blocks 308-312.

Method further comprises associating the first active optical module 102 with the second active optical module 102 using the information provided to the aggregation point 152 (block 320 shown in FIG. 3B). As noted above, in this example, when an active optical module 102 is attached to an authenticated port 106 of a switch 104, the software 134 associated with that switch 104 sends the authentication entity 154 a message that informs the authentication entity 154 that the active optical module 102 has been attached to that authenticated port 106 and that includes information identifying the active optical module 102 (and/or active optical cable segment 110 of which it is a part), the switch 104, and the authenticated port 106 (for example, by providing a module or segment identifier, switch identifier, and a port identifier) along with the challenge data and encrypted response data. In response to receiving such a message, the authentication entity 154 then sends a request to the aggregation point 152 asking the aggregation point 152 to identify the other end of the logical communication path that the identified active optical module 102 is a port of. This request includes the switch identifier and port identifier used by the aggregation point 156 to identify that switch 104 and port 106.

The aggregation point 152 responds to such a request by using the information it maintains in its database to "walk" or "trace" the communication path formed from that authenticated port 106 to the other end of the logical communication path of which the identified active optical module 102 is a part. This information includes information that was previously communicated to the aggregation point 152 from the switches 104, fiber patch panels 108, etc. and stored in the database In this example, the aggregation point 152 is able to associate the first active optical module 102 with the first passive optical connector 118 based on the segment identifier that is stored in both the active-end storage device 128 and the passive-end storage device 132. As noted above, this information was communicated to the aggregation point 152 in connection with the processing described above in connection with blocks 302-306.

The aggregation point 152 is able to associate the first passive optical connector 118 (and, therefore, the first active optical module 102) with the first patch panel port 138 based on the information provided to it by the first patch panel 108, which associates the connector identifier for the first passive optical connector 118 with the port identifier for the first patch-panel port 138. Also, the port map for the first fiber patch panel 108 provided to the aggregation point 152 by the first patch panel 108 is used to associate the first fiber patch-panel port 138 (and, therefore, the first passive optical connector 118, and the first active optical module 102) to one of the fiber pairs in the optical trunk cable 144. Likewise, the port map for the second fiber patch panel 108 provided to the aggregation point 152 by the second fiber patch panel 108 is used to associate that fiber pair in the optical trunk cable 144 with the second patch-panel port 138 of the second fiber patch panel 108. The aggregation point 152 is able to associate the second patch-panel port 138 (and, therefore, the first patch-panel port 138, the first passive optical connector 118, and the first active optical module 102) with the passive optical connector 118 attached to the second active optical cable segment 110. The aggregation point 152 does this using the information provided to it by the second fiber patch panel 108, which associates the port identifier for the second patch-panel port 138 with the segment identifier for the second active optical cable segment 110.

The aggregation point 152 is able to associate the passive optical connector 118 attached to the second active optical cable segment 110 to the second active optical module 102 attached to the active end 114 of the second active optical cable segment 110 based on the module or segment identifier that is stored in both the active-end storage device 128 and the passive-end storage device 132 that are attached to the second active optical cable segment 110. As noted above, this information was communicated to the aggregation point 152 in connection with the processing described above in connection with blocks 302-306. The aggregation point 152 is able to associate the second active optical cable segment 110 (and the second active optical module 102 attached thereto) to the second authenticated port 106 based on the information provided to it by the second switch 104, which associates the module or segment identifier for the second active optical module 102 (and/or the active optical cable segment 110 of which it is part) with the port identifier for the second authenticated port 106.

In this way, the aggregation point 152 is able to associate the first active optical module 102 with the second active optical module 102. The aggregation point 152 responds to the request from the authentication point 154 by sending a message that identifies the second active optical module 102 as being at the other end of the logical communication path that the first active optical module 102 is a part of.

Method 300 further comprises authenticating the first and second active optical modules 102 using the authentication information (block 322). In this example, the authentication entity 154 authenticates each of the first and second active optical modules 102 by using the associated segment identifier for that module 102 to look up the private key assigned to the module 102, decrypting the encrypted response data using that private key, and then comparing the decrypted response data to the challenge data. If the decrypted response data matches the challenge data, that module 102 is considered authentic.

Method 300 further comprises enabling the first and second authenticated ports 106 for use with the first and second active optical modules 102 if both of the first and second active optical modules 102 are successfully authenticated (block 324). In this example, if both the first and second active optical modules 102 are successfully authenticated by the authentication entity 154, the authentication entity 154 sends messages to both the first and second switches 104 instructing those switches 104 to enable the first and second authenticated ports 106, respectively. In this example, if either one of the first and second active optical modules 102 is not successfully authenticated by the authentication entity 154, the authentication entity 154 sends messages to both the first and second switches 104 instructing those switches 104 to not enable (or to disable) the first and second authenticated ports 106, respectively.

In some situations, the manufacturer of the switches 104 and/or the active optical module 102 may not want the identifiers used in authenticating the active optical module 102 to be used for other purposes (including for the purpose of the aggregation point 152 associating one active optical module 102 with another active optical module 102).

To address this, the segment identifier that is stored in the passive-end storage device 132 and used by the aggregation point 152 to identify the active optical module 102 can comprise a predetermined bit sequence that is derived from a fixed part of the encrypted data stored in the active-end storage device 128. This predetermined bit sequence can be a subset of the fixed part of the encrypted data or can be generated from the fixed part of the encrypted data (or a subset thereof) (for example, using a hash function).

This predetermined bit sequence need only be sufficient to uniquely identify the active optical module 102 (and the associated active optical cable segment 110), and it does not need to correspond to the identifier used by the authentication entity 154 in authenticating the active optical module 102. In this way, the aggregation point 152 will be able to uniquely identify each active optical cable segment 110 and active optical modules 102 while preserving the secrecy of the identifiers used for authenticating the active optical modules 102.

A number of embodiments have been described. Nevertheless, it will be understood that various modifications to the described embodiments may be made without departing from the spirit and scope of the claimed invention.

EXAMPLE EMBODIMENTS

Example 1 includes a method of authenticating first and second active optical modules that terminate first and second active optical cable segments, each of which having a respective active end and a respective passive end, the method comprising: reading information from active-end storage devices attached to the respective active ends of the first and second active optical modules; providing information read from the active-end storage devices to an aggregation point; reading information from passive-end storage devices attached to the respective passive ends of the first and second active optical cable segments; providing information read from passive-end storage devices to the aggregation point; and authenticating the first and second active optical modules using information provided to the aggregation point.

Example 2 includes the method of Example 1, wherein the passive end of the first active optical cable segment is connected to a first port of a first passive optical interconnect and wherein the passive end of the second active optical cable segment is connected to a second port of a second passive optical interconnect.

Example 3 includes the method of Example 2, wherein the first and second passive optical interconnect are communicatively coupled to one another using a trunk cable, wherein the method further comprises providing information about the trunk cable to the aggregation point.

Example 4 includes a system for use with a first and second active optical cable segment, each of the first and second active optical cable segments having a respective active end and a passive end, the system comprising: first and second host devices, the first host device having a first authenticated port and the second host device having a second authenticated port; wherein the first authenticated port is configured so that a respective electrical connector terminating the respective active end of the first active optical cable segment can be coupled to the first authenticated port, wherein the first authenticated port is also configured to provide access to a first active-end storage device associated with the active end of the first active optical cable segment when the first active optical cable segment is coupled to the first authenticated port; and wherein the second authenticated port is configured so that a respective electrical connector terminating a respective active end of a second active optical cable segment can be coupled to the second authenticated port, wherein the second authenticated port is also configured to provide access to a second active-end storage device associated with the active end of the second active optical cable segment when the second active optical cable segment is coupled to the second authenticated port; wherein the system further comprises first and second passive optical interconnects, the first passive optical interconnect comprising a first port and the second passive optical interconnect comprising a second port; wherein the first port is configured so that a respective passive optical connector terminating the respective passive end of the first active optical cable segment can be coupled to the first port, wherein the first port is also configured to provide access to a first passive-end storage device associated with the passive end of the first active optical cable segment when the first active optical cable segment is coupled to the first port; wherein the second port is configured so that a respective optical passive connector terminating the respective passive end of the second active optical cable segment can be coupled to the second port, wherein the second port is also configured to provide access to a second passive-end storage device associated with the passive end of the second active optical cable segment when the second active optical cable segment is coupled to the second port; wherein the first and second ports are communicatively coupled to one another via one or more other cable segments; and wherein an active optical communication path can be established between the first authenticated port and the second authenticated port using the first active optical cable segment, the second active optical cable segment, and one or more passive cable segments; wherein the system further comprises an aggregation point that is communicatively coupled to the first and second host devices and the first and second passive optical interconnects; wherein the aggregation point is configured to receive: information read from the first and second active-end storage devices attached to the first and second active optical cable segments, respectively; information read from the first and second passive-end storage devices attached to the first and second active optical cable segments, respectively; and information about the one or more other cable segments used to establish the active optical communication path between the first and second authenticated ports; and wherein the system further comprises an aggregation point that is communicatively coupled to the aggregation point and the first and second host devices, wherein information indicative of the active optical communication path is communicated from the aggregation point to the authentication entity in connection with authenticating the first and second active optical cable segments for use with the first and second authenticated ports.

Example 5 includes the system of Example 4, wherein the information read from the first and second active-end storage devices attached to the first and second active optical cable segments, respectively, includes encrypted authentication information.

Example 6 includes the system of Example 5, wherein each of the first and second host devices is configured to do the following in connection with reading the encrypted authentication information from the first and second active-end storage devices, respectively: write respective challenge data to the first or second active-end storage device, respectively; read a respective encrypted response from the first or second active-end storage device, respectively, wherein the respective encrypted response is generated and stored in the first or second active-end storage device by the first or second active optical cable segment by encrypting the respective challenge data using a respective private key.

Example 7 includes the system of any of Examples 4-6, wherein the host devices comprises one or more of: switches, routers, gateways, access points, server computers, end-user computers, appliance computers, network-attached storage (NAS) devices, and nodes of a storage area network (SAN).

Example 8 includes the system of any of Examples 4-7, wherein the passive optical interconnects comprise at least one of: fiber patch panels, fiber distribution hubs (FDH), fiber splice panels, fiber trays, and fiber termination points.

Example 9 includes the system of any of Examples 4-8, wherein each active optical cable segment comprises: one or more optical fibers; an active optical module at the active end of the optical fibers; a passive optical connector at the passive end of the optical fibers.

Example 10 includes the system of any of the Examples 49, wherein each active optical module comprises: an optical transceiver; a controller; the active-end storage device; and an electrical connector.

Example 11 includes the system of any of Examples 4-10, wherein the first and second passive optical interconnects comprise first and second fiber patch panels, respectively, including the first and second ports, respectively, wherein the first and second fiber patch panels are communicatively coupled to one another using an optical trunk cable, wherein the optical trunk cable communicatively couples the first port of the first fiber patch panel to the second port of the second fiber patch panel.

Example 12 includes the system of Example 11, wherein the optical trunk cable comprises first and second multi-fiber connectors at ends thereof, wherein each multi-fiber connector comprises a respective trunk-cable storage device in which information about the optical trunk cable is stored.

Example 13 includes the system of Example 12, wherein the aggregation point is configured to receive information read from the first and second trunk-cable storage devices.

Example 14 includes the system of any of Examples 4-13, wherein respective identifiers for the first and second active optical cable segments communicated to the aggregation point differ from respective identifiers for the first and second active optical cable segments used by the authentication entity for the authenticating the first and second active optical cable segments.

Example 15 includes the system of Example 14, wherein each of the identifiers for the first and second active optical cable segments communicated to the aggregation point comprises a predetermined bit sequence based on a portion of a fixed part of the information stored in the respective first or second active-end storage device.

Example 16 includes the system of any of Examples 4-15, wherein the active optical cable segments comprise at least one of an ETHERNET cable segment, a FIBRE CHANNEL cable segment, an INFINIBAND cable segment, a Serial Attached SCSI (SAS) cable segment, and a SONET/SDH cable segment.

Example 17 includes a cable comprising at least a first optical fiber extending from a first end to a second end; an active optical component terminating the first end of the first optical fiber, the active optical component including an electrical connector configured to receive electrical signals converted from optical signals carried over the first optical fiber, and the active optical component including a first storage device that is electrically connected to the electrical connector; and a fiber optic connector terminating the second end of the first optical fiber, the fiber optic connector including an optical ferrule that is configured to receive optical signals carried over the first optical fiber, the fiber optic connector including a second storage device and a media reading interface that are isolated from the optical signals carried over the first optical fiber, wherein the second storage device is electrically connected to the media reading interface.

Example 18 includes the cable of Example 17, wherein at least a first optical fiber comprises a plurality of optical fibers, wherein the active optical component terminates a first end of each of the optical fibers.

Example 19 includes the cable of Example 18, wherein the fiber optic connector terminates a second end of each of the optical fibers.

Example 20 includes the cable of any of Examples 18-19, wherein a second end of each of the optical fibers is separately terminated at a single fiber optical connector.

The invention claimed is:

1. A method of authenticating *at least one of* first and second active optical modules that terminate first and second active optical cable segments, each of which having a respective active end and a respective passive end, the method comprising:

reading, by a first device, information from a respective active-end storage device included in the respective active optical module that terminates the first active optical cable segment, wherein the first device is connected to the first active optical cable segment via the respective active optical module that terminates the first active optical cable segment;

reading, by a second device, information from a respective active-end storage device included in the respective active optical module that terminates the second active optical cable segment, wherein the second device is connected to the second active optical cable segment via the respective active optical module that terminates the second active optical cable segment;

providing, from the first device to an aggregation point, at least some of the information read from the respective active-end storage device included in the respective active optical module that terminates the first active optical cable segment;

providing, from the second device to the aggregation point, at least some of the information read from the respective active-end storage device included in the respective active optical module that terminates the second active optical cable segment;

reading, at a first port that is not included in the first device or the second device, information from a respective passive-end storage device attached to the respective passive end of the first active optical cable segment, wherein the first active optical cable segment is connected to the first port;

reading, at a second port that is not included in the first device or the second device, information from a respective passive-end storage device attached to the respective passive end of the second active optical cable segment, wherein the second active optical cable segment is connected to the second port;

providing at least some of the information read from the passive-end storage devices to the aggregation point; and authenticating *at least one of* the first and second active optical modules using at least some of *the* information provided to the aggregation point; and wherein the first device and the second device are communicatively coupled to one another via a logical communication path that includes the first and second active optical cable segments.

2. The method of claim 1, wherein the first port is included in a first passive optical interconnect and wherein the second port is included in a second passive optical interconnect.

3. The method of claim 2, wherein the first and second passive optical interconnect are communicatively coupled to one another using a trunk cable, wherein the method further comprises providing information about the trunk cable to the aggregation point.

4. A system for use with first and second active optical cable segments, each of the first and second active optical cable segments having a respective active end and a passive end, the system comprising:

first and second host devices, the first host device having a first authenticated port and the second host device having a second authenticated port;

wherein the first authenticated port is configured so that a respective electrical connector terminating the respective active end of the first active optical cable segment can be coupled to the first authenticated port, wherein the first authenticated port is also configured to provide access to a first active-end storage device associated with the active end of the first active optical cable segment when the first active optical cable segment is coupled to the first authenticated port; and wherein the second authenticated port is configured so that a respective electrical connector terminating the respective active end of the second active optical cable segment can be coupled to the second authenticated port, wherein the second authenticated port is also configured to provide access to a second active-end storage device associated with the active end of the second active optical cable segment when the second active optical cable segment is coupled to the second authenticated port;

wherein the system further comprises first and second passive optical interconnects, the first passive optical interconnect comprising a first port and the second passive optical interconnect comprising a second port;

wherein the first port is configured so that a respective passive optical connector terminating the respective passive end of the first active optical cable segment can be coupled to the first port, wherein the first port is also configured to provide access to a first passive-end storage device associated with the passive end of the first active optical cable segment when the first active optical cable segment is coupled to the first port;

wherein the second port is configured so that a respective optical passive connector terminating the respective passive end of the second active optical cable segment can be coupled to the second port, wherein the second port is also configured to provide access to a second passive-end storage device associated with the passive end of the second active optical cable segment when the second active optical cable segment is coupled to the second port;

wherein the first and second ports are communicatively coupled to one another via one or more other cable segments; and wherein an active optical communication path can be established between the first authenticated port and the second authenticated port using the first active optical cable segment, the second active optical cable segment, and one or more passive cable segments;

wherein the system further comprises an aggregation point that is communicatively coupled to the first and second host devices and the first and second passive optical interconnects;

wherein the aggregation point is configured to receive:

information read from the first and second active-end storage devices attached to the first and second active optical cable segments, respectively;

information read from the first and second passive-end storage devices attached to the first and second active optical cable segments, respectively; and information about the one or more other cable segments used to establish the active optical communication path between the first and second authenticated ports; and wherein the system further comprises an authentication entity that is communicatively coupled to the aggregation point and the first and second host devices, wherein information indicative of the active optical communication path is communicated from the aggregation point to the authentication entity in connection with authenticating the first and second active optical cable segments for use with the first and second authenticated ports.

5. The system of claim 4, wherein the information read from the first and second active-end storage devices attached to the first and second active optical cable segments, respectively, includes encrypted authentication information.

6. The system of claim 5, wherein each of the first and second host devices is configured to do the following in connection with reading the encrypted authentication information from the first and second active-end storage devices, respectively:

write respective challenge data to the first or second active-end storage device, respectively;

read a respective encrypted response from the first or second active-end storage device, respectively, wherein the respective encrypted response is generated and stored in the first or second active-end storage device by the first or second active optical cable segment by encrypting the respective challenge data using a respective private key.

7. The system of claim 4, wherein the host devices comprises one or more of:

switches, routers, gateways, access points, server computers, end-user computers, appliance computers, network-attached storage (NAS) devices, and nodes of a storage area network (SAN).

8. The system of claim 4, wherein the passive optical interconnects comprise at least one of:

fiber patch panels, fiber distribution hubs (FDH), fiber splice panels, fiber trays, and fiber termination points.

9. The system of claim 4, wherein each active optical cable segment comprises:

one or more optical fibers;

an active optical module at the active end of the optical fibers;

a passive optical connector at the passive end of the optical fibers.

10. The system of claim 4, wherein each active optical module comprises:

an optical transceiver;

a controller;

the active-end storage device; and an electrical connector.

11. The system of claim 4, wherein the first and second passive optical interconnects comprise first and second fiber patch panels, respectively, including the first and second ports, respectively, wherein the first and second fiber patch panels are communicatively coupled to one another using an optical trunk cable, wherein the optical trunk cable communicatively couples the first port of the first fiber patch panel to the second port of the second fiber patch panel.

12. The system of claim 11, wherein the optical trunk cable comprises first and second multi-fiber connectors at ends thereof, wherein each multi-fiber connector comprises a respective trunk-cable storage device in which information about the optical trunk cable is stored.

13. The system of claim 12, wherein the aggregation point is configured to receive information read from the first and second trunk-cable storage devices.

14. The system of claim 4, wherein respective identifiers for the first and second active optical cable segments communicated to the aggregation point differ from respective identifiers for the first and second active optical cable segments used by the authentication entity for the authenticating the first and second active optical cable segments.

15. The system of claim 14, wherein each of the identifiers for the first and second active optical cable segments communicated to the aggregation point comprises a predetermined bit sequence based on a portion of a fixed part of the information stored in the respective first or second active-end storage device.

16. The system of claim 4, wherein the active optical cable segments comprise at least one of an ETHERNET cable segment, a FIBRE CHANNEL cable segment, an INFINIBAND cable segment, a Serial Attached SCSI (SAS) cable segment, and a SONET/SDH cable segment.

*17. A system for use with a first active optical cable segment, the first active optical cable segment having an active end and a passive end, the system comprising:*

*a first active device, the first active device having a first active port, wherein the first active port is configured so that the active end of the first active optical cable segment can be coupled to the first active port, wherein the first active port is also configured to provide access to an active-end storage device associated with the active end of the first active optical cable segment when the first active optical cable segment is coupled to the first active port and wherein the first active device is configured to communicate over the first active optical cable segment using a first optical transceiver; and*

*an optical interconnect, the optical interconnect comprising an optical interconnect port, wherein the optical interconnect port is configured so that an optical connector terminating the passive end of the first active optical cable segment can be coupled to the optical interconnect port, wherein the optical interconnect port is also configured to provide access to a passive-end storage device associated with the passive end of the first active optical cable segment when the first active optical cable segment is coupled to the optical interconnect port;*

*wherein the system is configured to establish an active optical communication path between the first active port of the first active device and a second active port of a second active device using the first active optical cable segment, the optical interconnect, and a second active optical cable segment; and*

*wherein the system is configured to implement a policy at the first active device for the active optical communication path using information read from the active-end storage device attached to the first active optical cable segment and information read from the passive-end storage device attached to the first active optical cable segment.*

*18. The system of claim 17, further comprising a software entity configured to receive the information read from the active-end storage device attached to the first active optical cable segment and the information read from the passive-end storage device attached to the first active optical cable segment.*

*19. The system of claim 18, wherein the software entity is further configured to, at least in part, implement the policy at the first active device for the active optical communication path.*

*20. The system of claim 17, wherein the first active device comprises a switching device including a plurality of active ports including the first active port, the switching device switching signals between the plurality of active ports, wherein the policy is implemented at the switching device.*

*21. The system of claim 20, wherein the policy implemented at the switching device comprises authenticating the first active port.*

*22. The system of claim 17, wherein the active optical communication path includes a multi-fiber cable.*

*23. The system of claim 17, wherein the active optical communication path includes a trunk cable.*

*24. The system of claim 17, wherein the first optical transceiver is a part of an active optical module that terminates the first active optical cable segment.*

*25. A method for use with first and second active optical cable segments connected to first and second optical transceivers, respectively, each active optical cable segment having a respective active end and a respective passive end, the method comprising:*

*reading, by a first device, information from a respective active-end storage device associated with the active end of the first active optical cable segment, wherein the first device communicates over the first active optical cable segment via the first optical transceiver connected to the first active optical cable segment;*

*reading, by a second device, information from a respective active-end storage device associated with the second active optical cable segment, wherein the second device communicates over the second active optical cable segment via the second optical transceiver connected to the second active optical cable segment;*

*providing, from the first device to an aggregation point, at least some of the information read from the respective active-end storage device associated with the first active optical cable segment;*

*providing, from the second device to the aggregation point, at least some of the information read from the respective active-end storage device associated with the second active optical cable segment;*

*reading, at a first port that is not included in the first device or the second device, information from a respective passive-end storage device attached to the respective passive end of the first active optical cable segment, wherein the first active optical cable segment is connected to the first port;*

*reading, at a second port that is not included in the first device or the second device, information from a respective passive-end storage device attached to the respective passive end of the second active optical cable segment, wherein the second active optical cable segment is connected to the second port, wherein the first device and the second device are communicatively coupled to one another via a logical communication path that includes the first and second active optical cable segments;*

*providing at least some of the information read from the passive-end storage devices to the aggregation point; and*

*implementing a policy at the first device, for the logical communication path that includes the first and second active optical cable segments, using at least some of information provided to the aggregation point.*

*26. The method of claim 25, wherein the first device comprises an active switching device that includes a plurality of ports, the active switching device switching signals between the plurality of ports of the active switching device.*

*27. The method of claim 26, wherein the policy comprises authenticating at least one of the first and second optical transceivers using at least some of the information provided to the aggregation point.*

*28. The method of claim 25, wherein the logical communication path includes a multi-fiber cable.*

*29. The method of claim 25, wherein the logical communication path includes a trunk cable.*

*30. The method of claim 25, wherein the first and second optical transceivers are part of first and second active optical modules, respectively, that terminate the first and second active optical cable segments, respectively.*

* * * * *